US011914835B2

(12) United States Patent
Jeong

(10) Patent No.: US 11,914,835 B2
(45) Date of Patent: Feb. 27, 2024

(54) METHOD FOR DISPLAYING USER INTERFACE AND ELECTRONIC DEVICE THEREFOR

(71) Applicant: SAMSUNG ELECTRONICS CO., LTD., Suwon-si (KR)

(72) Inventor: Eunsu Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 186 days.

(21) Appl. No.: 17/525,607

(22) Filed: Nov. 12, 2021

(65) Prior Publication Data

US 2022/0155910 A1    May 19, 2022

Related U.S. Application Data

(63) Continuation of application No. PCT/KR2021/013564, filed on Oct. 5, 2021.

(30) Foreign Application Priority Data

Nov. 16, 2020    (KR) .......................... 10-2020-0152766

(51) Int. Cl.
  *G06F 3/048*    (2013.01)
  *G06F 3/0481*    (2022.01)
  (Continued)

(52) U.S. Cl.
  CPC ......... *G06F 3/0481* (2013.01); *G02B 27/017* (2013.01); *G02B 27/0179* (2013.01);
  (Continued)

(58) Field of Classification Search
  CPC ................. G06F 3/0481; G06F 3/0484; G06F 2203/04804; G02B 27/017;
  (Continued)

(56) References Cited

U.S. PATENT DOCUMENTS 9,366,862 B2 * 6/2016 Haddick ................. G06F 3/011
9,568,735 B2   2/2017 Park et al.
(Continued)

FOREIGN PATENT DOCUMENTS

JP   2014-071811   4/2014
JP   7047394       4/2022
(Continued)

OTHER PUBLICATIONS

Search Report and Written Opinion dated Feb. 3, 2022 in counterpart International Patent Application No. (PCT/KR2021/013564.

*Primary Examiner* — David Phantana-angkool
(74) *Attorney, Agent, or Firm* — Nixon & Vanderhye P.C.

(57) ABSTRACT

Disclosed is an electronic device including: a camera, a transparent display including a first area corresponding to a first visual field area and a second area corresponding to a second visual field area, at least one sensor, a processor, and a memory operatively connected to the processor. The electronic device may obtain motion information of the electronic device including a movement speed using the at least one sensor, may display a first user interface including at least one graphic user interface (GUI) corresponding to an application execution screen in the first area of the transparent display based on the movement speed not being greater than a first speed, and may display the at least one GUI in the second area based on the movement speed exceeding the first speed.

20 Claims, 12 Drawing Sheets

(51) Int. Cl.
*G02B 27/01* (2006.01)
*G06F 3/0484* (2022.01)

(52) U.S. Cl.
CPC ...... *G06F 3/0484* (2013.01); *G02B 2027/014* (2013.01); *G02B 2027/0141* (2013.01); *G02B 2027/0187* (2013.01); *G06F 2203/04804* (2013.01)

(58) Field of Classification Search
CPC .......... G02B 27/0179; G02B 2027/014; G02B 2027/0141; G02B 2027/0187
See application file for complete search history.

(56) References Cited

U.S. PATENT DOCUMENTS

| | | | |
|---|---|---|---|
| 9,678,342 B2 | 6/2017 | Yamamoto et al. | |
| 9,965,029 B2 | 5/2018 | Kimura et al. | |
| 10,030,987 B2* | 7/2018 | Maiwand | G01C 21/36 |
| 10,037,084 B2* | 7/2018 | Joo | G02B 27/017 |
| 10,203,762 B2* | 2/2019 | Bradski | H04N 21/414 |
| 10,209,516 B2 | 2/2019 | Yamamoto et al. | |
| 10,215,583 B2* | 2/2019 | Ng-Thow-Hing | G01C 21/3658 |
| 10,860,100 B2* | 12/2020 | Osterhout | G06F 3/0346 |
| 11,074,887 B2 | 7/2021 | Kanashima et al. | |
| 11,178,344 B2 | 11/2021 | Kobayashi et al. | |
| 11,275,482 B2* | 3/2022 | Osterhout | G06F 3/017 |
| 11,308,670 B2* | 4/2022 | Tanaka | G06F 3/0346 |
| 11,360,728 B2* | 6/2022 | Kim | G06F 3/04883 |
| 11,567,571 B2* | 1/2023 | Kuruva | G06V 20/20 |
| 11,568,599 B2* | 1/2023 | Li | B60K 35/00 |
| 11,579,752 B1* | 2/2023 | Sarria, Jr. | G06V 20/20 |
| 11,605,320 B1* | 3/2023 | Popp | G09G 3/001 |
| 11,630,314 B2* | 4/2023 | Kaehler | G06F 3/011 345/589 |
| 11,656,690 B2* | 5/2023 | Qian | G06F 3/012 345/157 |
| 11,699,448 B2* | 7/2023 | Orr | H04L 12/282 704/275 |
| 2010/0259471 A1 | 10/2010 | Takano et al. | |
| 2015/0268721 A1* | 9/2015 | Joo | G06V 20/20 345/156 |
| 2016/0003636 A1* | 1/2016 | Ng-Thow-Hing | G01C 21/365 701/418 |
| 2016/0004079 A1 | 1/2016 | Takano et al. | |
| 2016/0026253 A1* | 1/2016 | Bradski | H04N 13/128 345/8 |
| 2016/0034042 A1* | 2/2016 | Joo | G02B 27/0093 345/633 |
| 2017/0069288 A1 | 3/2017 | Kanashima et al. | |
| 2017/0308258 A1* | 10/2017 | Xu | G06F 13/14 |
| 2018/0063341 A1* | 3/2018 | Cho | H04N 1/00127 |
| 2018/0157398 A1* | 6/2018 | Kaehler | G06V 20/20 |
| 2018/0197502 A1 | 7/2018 | Kanashima et al. | |
| 2018/0210204 A1 | 7/2018 | Takano et al. | |
| 2018/0314339 A1* | 11/2018 | Joo | G02B 27/017 |
| 2018/0339654 A1* | 11/2018 | Kim | G09G 5/37 |
| 2019/0041231 A1 | 2/2019 | Kitada | |
| 2020/0042098 A1* | 2/2020 | Joo | G06F 3/017 |
| 2020/0356180 A1* | 11/2020 | Joo | G06F 3/017 |
| 2021/0169417 A1* | 6/2021 | Burton | A61B 5/4857 |
| 2021/0173480 A1* | 6/2021 | Osterhout | G06F 3/0227 |
| 2022/0066724 A1* | 3/2022 | Moon | G06F 3/0481 |
| 2022/0155909 A1* | 5/2022 | Kawashima | G06F 3/0362 |
| 2022/0155910 A1* | 5/2022 | Jeong | G06F 3/0484 |
| 2022/0229524 A1* | 7/2022 | Mckenzie | G06F 3/0481 |
| 2022/0287180 A1* | 9/2022 | Yang | G06F 1/163 |
| 2022/0350414 A1* | 11/2022 | Lee | G06F 3/012 |
| 2022/0350559 A1* | 11/2022 | Yoon | G02B 27/0176 |
| 2023/0014553 A1* | 1/2023 | Homma | G06T 5/005 |
| 2023/0087202 A1* | 3/2023 | Lavoie | G06F 3/04883 701/2 |
| 2023/0100610 A1* | 3/2023 | Pastrana Vicente | G06F 3/017 715/727 |
| 2023/0114043 A1* | 4/2023 | Wan | G06F 3/013 345/633 |
| 2023/0152900 A1* | 5/2023 | Kim | G06F 3/011 348/53 |
| 2023/0154060 A1* | 5/2023 | Rho | G06F 3/012 345/633 |
| 2023/0196689 A1* | 6/2023 | Jang | G06F 3/04842 345/419 |
| 2023/0199328 A1* | 6/2023 | Cho | G02B 27/0172 348/241 |
| 2023/0215547 A1* | 7/2023 | Harley | G16H 30/40 702/20 |

FOREIGN PATENT DOCUMENTS

| | | |
|---|---|---|
| KR | 10-2016-0016540 | 2/2016 |
| KR | 10-1736991 | 5/2017 |
| KR | 10-2019-0113645 | 10/2019 |

\* cited by examiner

METHOD FOR DISPLAYING USER INTERFACE AND ELECTRONIC DEVICE THEREFOR

CROSS-REFERENCE TO RELATED APPLICATIONS

This application is a national stage of International Application No. PCT/KR2021/013564 designating the United States, filed on Oct. 5, 2021, in the Korean Intellectual Property Receiving Office and claiming priority to Korean Patent Application No. 10-2020-0152766, filed on Nov. 16, 2020, in the Korean Intellectual Property Office, the disclosures of which are incorporated by reference herein in their entireties.

BACKGROUND

Field

The disclosure relates to a method for displaying a user interface and an electronic device supporting the same.

Description of Related Art

As a technology associated with a wearable electronic device develops, various types of wearable electronic devices are being released. The wearable electronic device may be referred to as an "electronic device" that a person is capable of wearing and using. For example, various types of wearable electronic devices such as a wearable watch, wearable glasses, and/or a wearable belt are being released.

For example, because wearable glasses are implemented in a form of glasses, there is the convenience of using an electronic device without using both hands. The wearable glasses may provide a user with various pieces of information by displaying a user interface including various pieces of information on a display.

Wearable glasses may provide various pieces of information without using a hand. However, because user interfaces are displayed while being overlaid on a user's visual field, the user may not perceive surrounding situations.

For example, when the user wears wearable glasses while he/she is walking or running, it may be difficult for the user to perceive the presence of surrounding objects or people. In the worst case, an accident that collides with external objects may occur.

SUMMARY

According to an example embodiment, an electronic device may include: a camera, a transparent display including a first area corresponding to a first visual field area and a second area corresponding to a second visual field area, at least one sensor, a processor, and a memory operatively connected to the processor. The memory may store one or more instructions that, when executed, cause the processor to: obtain motion information of the electronic device including a movement speed using the at least one sensor, to control the display to display a first user interface including at least one graphic user interface (GUI) corresponding to an application execution screen in the first area of the transparent display based on the movement speed not being greater than a first speed, and to control the display to display the at least one GUI in the second area based on the movement speed exceeding the first speed.

According to an example embodiment, a method in which an electronic device displays a user interface may include: obtaining motion information of the electronic device including a movement speed using at least one sensor, displaying a first user interface including at least one GUI corresponding to an application execution screen in a first area based on the movement speed not being greater than a first speed, and displaying the at least one GUI in a second area based on the movement speed exceeding the first speed.

According to various example embodiments of the disclosure, an electronic device may provide intuitive and convenient usability by flexibly changing a user interface displaying method based on a user's states.

The user may employ wearable glasses more safely by simplifying and/or minimizing the display of a user interface or by terminating the display of the user interface when it is determined that the user's motion information obtained using a sensor exceeds a specified reference.

Furthermore, the electronic device may change and display various types of user interfaces flexibly based on information about the user's state as well as external environments obtained using a camera.

Besides, a variety of effects directly or indirectly understood through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
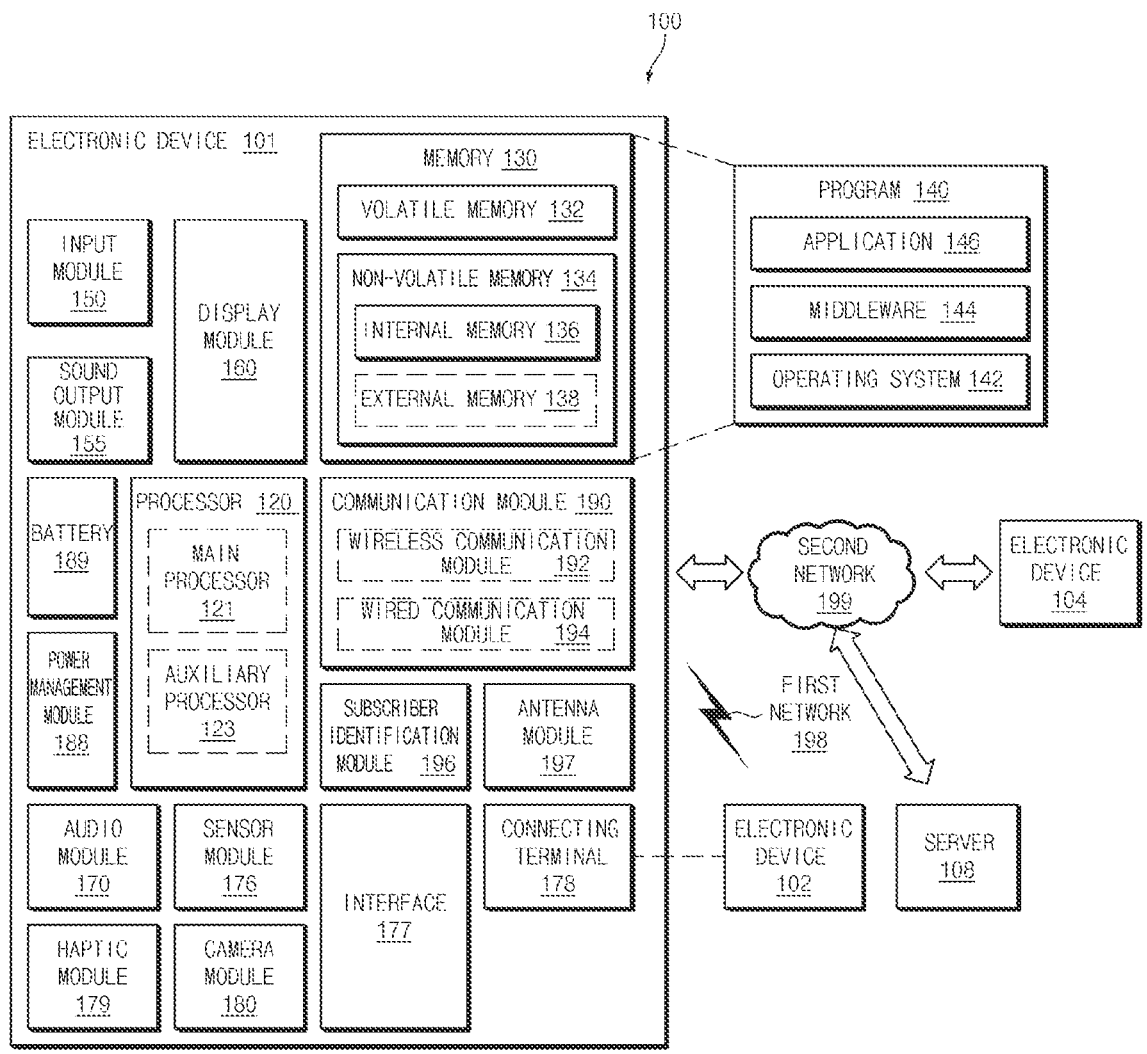
FIG. 1 is a block diagram illustrating an example electronic device in a network environment according to various embodiments.

Hereinafter, various example embodiments of the disclosure will be described in greater detail with reference to the accompanying drawings. However, it should be understood that the disclosure is not limited to specific embodiments, but rather includes various modifications, equivalents and/or alternatives of the embodiments of the present disclosure. Regarding description of the drawings, like reference numerals may refer to like elements.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
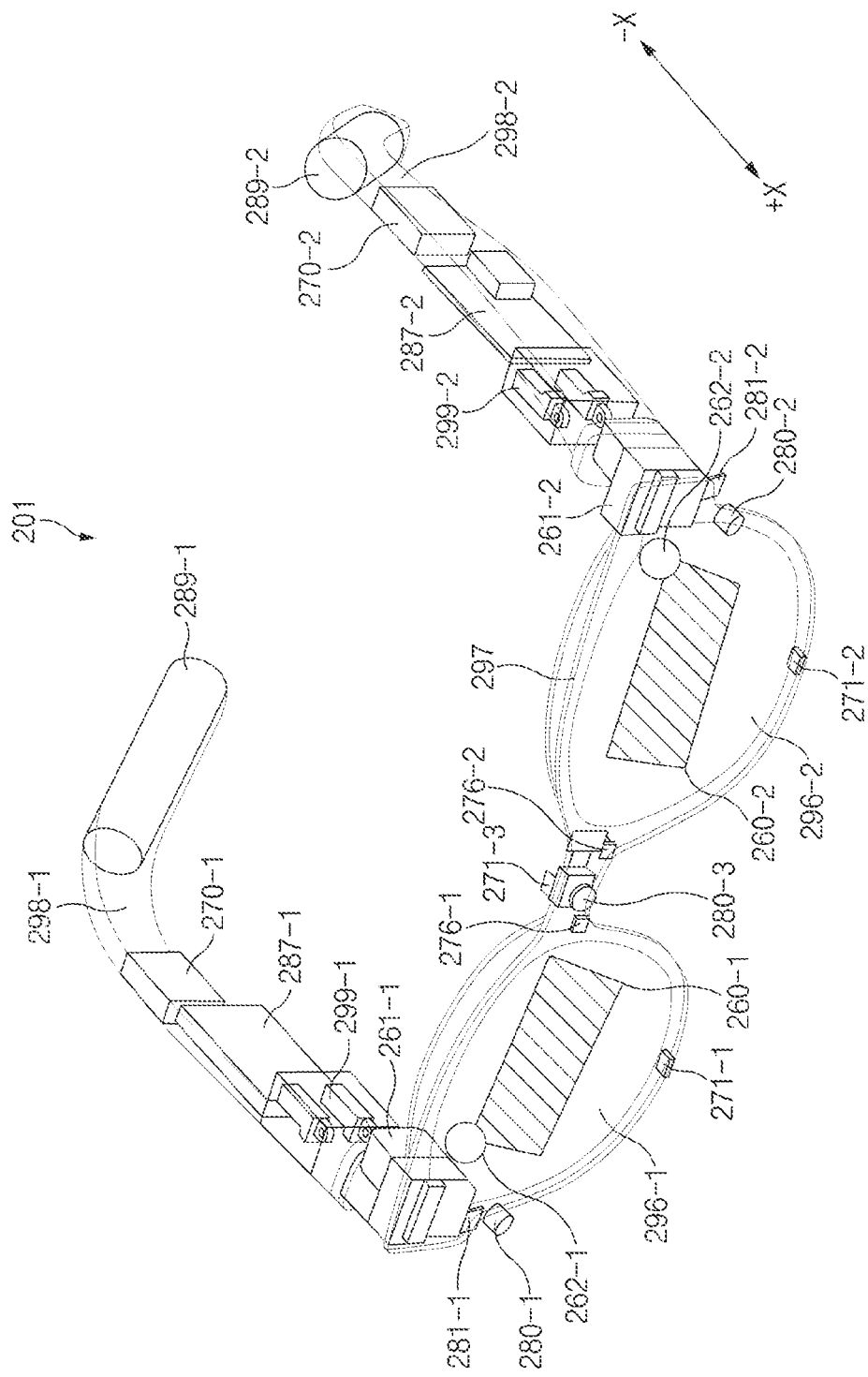
FIG. 2 is a diagram illustrating an example electronic device, according to various embodiments.

FIG. 2 is a diagram illustrating an example electronic device 201, according to various embodiments.

Referring to FIG. 2, in an example of FIG. 2, the electronic device 201 may be referred to as a "head mounted display (HMD) device", a "wearable device", "smart glasses", "eyewear", etc. A shape of the electronic device 201 illustrated in FIG. 2 is an example, and embodiments of the disclosure are not limited thereto. For example, the electronic device 201 may be any electronic device configured to provide augmented reality (AR) or virtual reality (VR).

According to an embodiment, the electronic device 201 may include at least part of components of the electronic device 101 of FIG. 1. For example, the electronic device 201 may include at least one of a display (e.g., the display module 160 of FIG. 1), a camera (e.g., the camera module 180 of FIG. 1), at least one sensor (e.g., the sensor module 176 of FIG. 1), a processor (e.g., the processor 120 of FIG. 1), a battery (e.g., the battery 189 of FIG. 1), a memory (e.g., 130 of FIG. 1), or a communication circuit (e.g., the communication module 190 of FIG. 1). At least part of components of the electronic device 201 may be positioned inside the housing of the electronic device 201 or may be exposed to the outside of the housing.

The electronic device 201 may include a display. For example, the electronic device 201 may include a first display 261-1 and/or a second display 261-2. The first display 261-1 and/or the second display 261-2 may include, for example, and without limitation, at least one of a liquid crystal display (LCD), a digital mirror device (DMD), a liquid crystal on silicon (LCoS) device, an organic light emitting diode (OLED), or a micro light emitting diode (micro LED). For example, the display of the electronic device 201 may include at least one light source for irradiating light. When the first display 261-1 and/or the second display 261-2 includes one of a LCD, a DMD, or a LCoS device, the electronic device 201 may include at least one light source for irradiating light to a screen output area 260-1 and/or 260-2 of the display. As another example, when the display of the electronic device 201 may generate light by itself, the display may not include a light source other than a light source included in the display. When the first display 261-1 and/or the second display 261-2 includes at least one of an OLED or a micro LED, the electronic device 201 may provide an image to the user although the electronic device 201 does not include a separate light source. When the display is implemented with an OLED or a micro LED, the weight of the electronic device 201 may be reduced by omitting a separate light source.

According to an embodiment, the electronic device 201 may include a first transparent member 296-1 and/or a second transparent member 296-2. For example, when the user wears the electronic device 201, the user may see through the first transparent member 296-1 and/or the second transparent member 296-2. The first transparent member 296-1 and/or the second transparent member 296-2 may include, for example, and without limitation, at least one of a glass plate, a plastic plate, and a polymer, and may be transparent or translucent. For example, when the user wears the electronic device 201, the first transparent member 296-1 may be disposed facing the user's right eye, and the second transparent member 296-2 may be disposed facing the user's left eye.

According to an embodiment, at least part of the first transparent member 296-1 and/or the second transparent member 296-2 may be a waveguide. For example, the waveguide may deliver an image generated by a display (e.g., the first display 261-1 and/or the second display 261-2) to the user's eyes. The waveguide may be formed of glass, plastic or polymer. For example, the waveguide may include a nanopattern (e.g., a polygonal or curved grating structure) formed therein or on one surface. For example, light incident to one end of the waveguide may be propagated inside the waveguide by the nanopattern and may be provided to the user's eyes. For example, the waveguide including a freeform prism may be configured to provide the incident light to the user through a reflection mirror.

According to an embodiment, the waveguide may include at least one of a diffractive element (e.g., a diffractive optical element (DOE) or a holographic optical element (HOE)) or a reflective element (e.g., a reflective mirror). The waveguide may guide the display light emitted from a light source unit to the user's eyes using at least one diffractive element or reflective element included in the waveguide. For example, the diffractive element may include an input optical member (e.g., 262-1 and/or 262-2) and/or an output optical member (not shown). The first input optical member 262-1 and/or the second input optical member 262-2 may be referred to as an "input grating area". The output optical member (not shown) may be referred to as an "output grating area". The input grating area may diffract or reflect light output from a light source (e.g., a micro LED) to deliver the light to a transparent member (e.g., the first transparent member 296-1 and/or the second transparent member 296-2) of a screen display unit. The output grating area may diffract or reflect the light delivered to the transparent member (e.g., the first transparent member 296-1 and/or the second transparent member 296-2) of the waveguide in a direction of the user's eyes. For example, the reflective element may include a total internal reflection (TIR) optical element or a TIR waveguide for TIR. The TIR may be referred to as "one manner" for guiding light. The TIR may refer, for example, to light (e.g., an image) is incident such that the light input through the input grating area being reflected from one surface (e.g., a specific surface) of the waveguide, and then the light is delivered to the output grating area. In an embodiment, an optical path of light emitted from a display may be guided to the waveguide by the input optical member. The light that travels inside the waveguide may be guided in a direction of the user's eyes through the output optical member. The screen output areas 260-1 and/or 260-2 may be determined based on light emitted in a direction of the user's eyes.

In FIG. 2, it is described that the electronic device 201 provides an image to a user using a waveguide. However, embodiments of the disclosure are not limited thereto. According to an embodiment, the display of the electronic device 201 may be a transparent or translucent display. In this case, the display may be disposed at a location (e.g., the first screen output area 260-1 and/or the second screen output area 260-2) facing the user's eyes.

According to an embodiment, the electronic device 201 may include at least one camera. For example, the electronic device 201 may include a first camera 280-1, a second camera 280-2, and/or a third camera 280-3. For example, the first camera 280-1 and the second camera 280-2 may be used to recognize an external image. The first camera 280-1 and the second camera 280-2 may be configured to obtain an image corresponding to a direction (e.g., +x direction) corresponding to the user's gaze. The electronic device 201 may perform head tracking (e.g., 3 degree of freedom (DoF) or 6 DoF tracking), hand image detection, hand image tracking, and/or spatial recognition using the first camera 280-1 and the second camera 280-2. For example, the first camera 280-1 and the second camera 280-2 may be global shutter (GS) cameras having the same specifications and performance (e.g., an angle of view, a shutter speed, a resolution, and/or the number of color bits). The electronic device 201 may support a simultaneous localization and mapping (SLAM) technology by performing spatial recognition and/or depth information acquisition using stereo cameras arranged on the left and right sides. In addition, the electronic device 201 may recognize the user's gesture using the stereo cameras arranged on the left/right sides. The electronic device 201 may detect faster hand gestures and finer movements using a GS camera that has distortion less than a rolling shutter (RS) camera. For example, the third camera 280-3 may be used to recognize an external image. The third camera 280-3 may be configured to obtain an image corresponding to a direction (e.g., +x direction) corresponding to the user's gaze. In an embodiment, the third camera 280-3 may be a camera having a resolution higher than the first camera 280-1 and the second camera 280-2. The third camera 280-3 may be referred to as a high resolution (HR) camera or a photo video (PV) camera. The third camera 280-3 may support functions for obtaining high-quality images, such as auto focus (AF) and/or optical image stabilization (OIS). The third camera 280-3 may be a GS camera or an RS camera.

According to an embodiment, the electronic device 201 may include at least one eye-tracking sensor. For example, the electronic device 201 may include a first eye-tracking sensor 276-1 and a second eye-tracking sensor 276-2. For example, the first eye-tracking sensor 276-1 and the second eye-tracking sensor 276-2 may be cameras configured to obtain an image in a direction corresponding to the user's eye. The first eye-tracking sensor 276-1 and the second eye-tracking sensor 276-2 may be configured to obtain a user's right eye image and a user's left eye image, respectively. The electronic device 201 may be configured to detect the user's pupil using the first eye-tracking sensor 276-1 and the second eye-tracking sensor 276-2. The electronic device 201 may obtain the user's gaze from the user's pupil image, and may provide an image based on the obtained gaze. For example, the electronic device 201 may display an image such that the image is positioned in the gaze direction of the user. For example, the first eye-tracking sensor 276-1 and the second eye-tracking sensor 276-2 may be GS cameras having the same specifications and performance (e.g., an angle of view, a shutter speed, a resolution, and/or the number of color bits).

According to an embodiment, the electronic device 201 may include at least one illumination unit. For example, the illumination unit may include at least one LED. In FIG. 2, the electronic device 201 may include a first illumination unit 281-1 and a second illumination unit 281-2. For example, the electronic device 201 may provide auxiliary illumination for the first camera 280-1, the second camera 280-2, and/or the third camera 280-3 using the first illumination unit 281-1 and the second illumination unit 281-2. In an example, the electronic device 201 may provide illumination for obtaining a pupil image using an illumination unit (not shown). For example, the electronic device 201 may provide illumination for an eye-tracking sensor using an LED of an infrared wavelength. In this case, the eye-tracking sensor may include an image sensor for obtaining an infrared wavelength image.

According to an embodiment, the electronic device 201 may include at least one printed circuit board (PCB). For example, the electronic device 201 may include a first PCB 287-1 located in a first temple 298-1 and a second PCB 287-2 located in a second temple 298-2. The first PCB 287-1 and/or the second PCB 287-2 may be electrically connected to other components of the electronic device 201 through a signal line and/or a flexible PCB (FPCB). For example, a communication circuit, a memory, at least one sensor, and/or a processor may be disposed on the first PCB 287-1 and/or the second PCB 287-2. For example, each of the first PCB 287-1 and the second PCB 287-2 may include a plurality of PCBs spaced from one another by an interposer.

According to an embodiment, the electronic device 201 may include at least one battery. For example, the electronic device 201 may include a first battery 289-1 located at one end of the first temple 298-1 and a second battery 289-2 located at one end of the second temple 298-2. The first battery 289-1 and the second battery 289-2 may be configured to supply power to components of the electronic device 201.

According to an embodiment, the electronic device 201 may include at least one speaker. For example, the electronic device 201 may include a first speaker 270-1 and a second speaker 270-2. The electronic device 201 may be configured to provide stereo sound using speakers located on the left and right sides.

According to an embodiment, the electronic device 201 may include at least one microphone. For example, the electronic device 201 may include a first microphone 271-1, a second microphone 271-2, and/or a third microphone 271-3. The first microphone 271-1 may be located on a right side of a frame 297. The second microphone 271-2 may be located on a left side of the frame 297. The third microphone 271-3 may be located on a bridge of the frame 297. In an example, the electronic device 201 may perform beamforming using the first microphone 271-1, the second microphone 271-2, and/or the third microphone 271-3.

According to an embodiment, the electronic device 201 may include the first temple 298-1, the second temple 298-2, and the frame 297. The first temple 298-1, the second temple 298-2, and the frame 297 may be referred to as "housing". The first temple 298-1 may be physically connected to the frame 297 through a first hinge part 299-1. When the user wears the electronic device 201, the first temple 298-1 may support the frame 297. The second temple 298-2 may be physically connected to the frame 297 through a second hinge part 299-2. When the user wears the electronic device 201, the second temple 298-2 may support the frame 297.

The configuration of the electronic device 201 described above is an example, and embodiments of the disclosure are not limited thereto. For example, the electronic device 201 may not include at least part of components described with reference to FIG. 2, or may further include other components other than the components described with reference to FIG. 2. For example, the electronic device 201 may include at least one sensor (e.g., an acceleration sensor, a gyro sensor, and/or a touch sensor) and/or an antenna.

Figure 3:
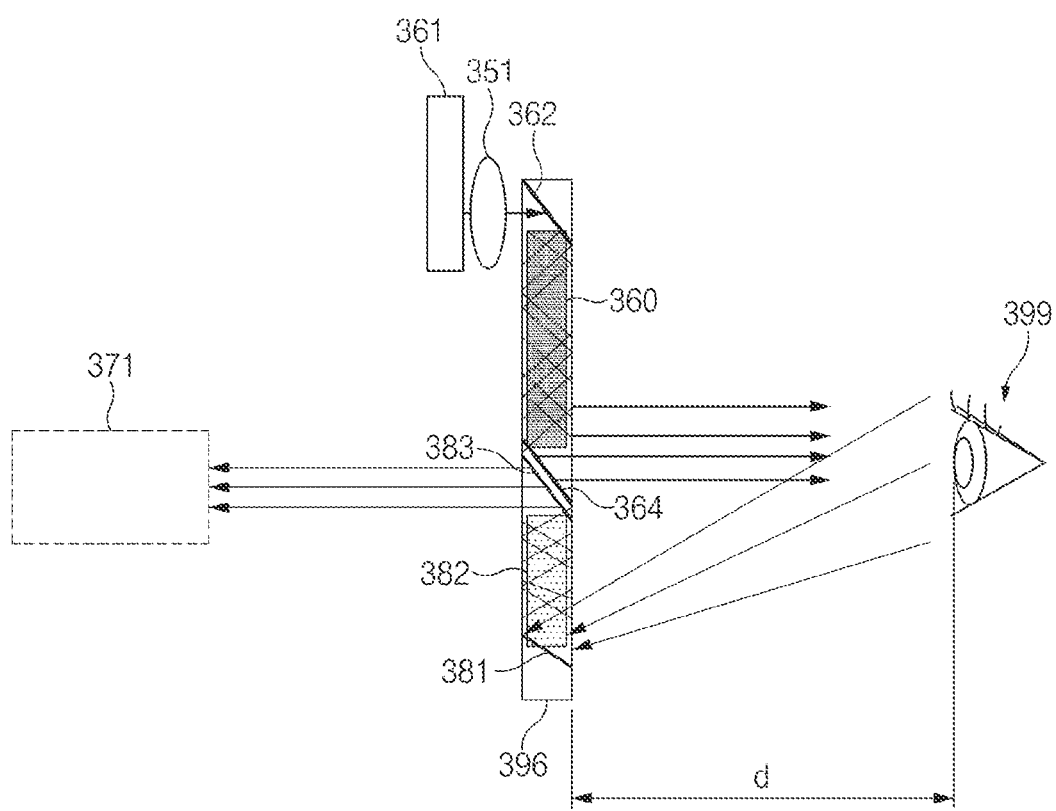
FIG. 3 is a diagram illustrating an example method of eye-tracking and displaying through a transparent member, according to various embodiments.

FIG. 3 is a diagram illustrating an example method of eye-tracking and displaying method through a transparent member, according to various embodiments.

Referring to FIG. 3, a display 361 (e.g., the first display 261-1 or the second display 261-2 in FIG. 2) may provide an image to a transparent member 396 (e.g., the first transparent member 296-1 or the second transparent member 296-2 of FIG. 2). According to an embodiment, the display 361 may input light corresponding to an image to an input optical member 362 (e.g., the first input optical member 262-1 or the second input optical member 262-2 of FIG. 2) through a lens 351. The input optical member 362 may reflect or diffract the incident light and then may input the reflected or diffracted light to a waveguide 360. An output optical member 364 may output light delivered through the waveguide 360 in a direction of a user's eye 399. In an example, the lens 351 may be included in the display 361. In an example, the location of the lens 351 may be determined based on a distance between the transparent member 396 and the user's eye 399.

An eye-tracking sensor 371 (e.g., the first eye-tracking sensor 276-1 or the second eye-tracking sensor 276-2 of FIG. 2) may obtain an image corresponding to at least part of the user's eye 399. For example, light corresponding to an image of the user's eye 399 may be reflected and/or diffracted through a first splitter 381 and then may be input to a waveguide 382. Light delivered to a second splitter 383 through the waveguide 382 may be reflected and/or diffracted by the second splitter 383 and then may be output to the eye-tracking sensor 371.

Figure 4:
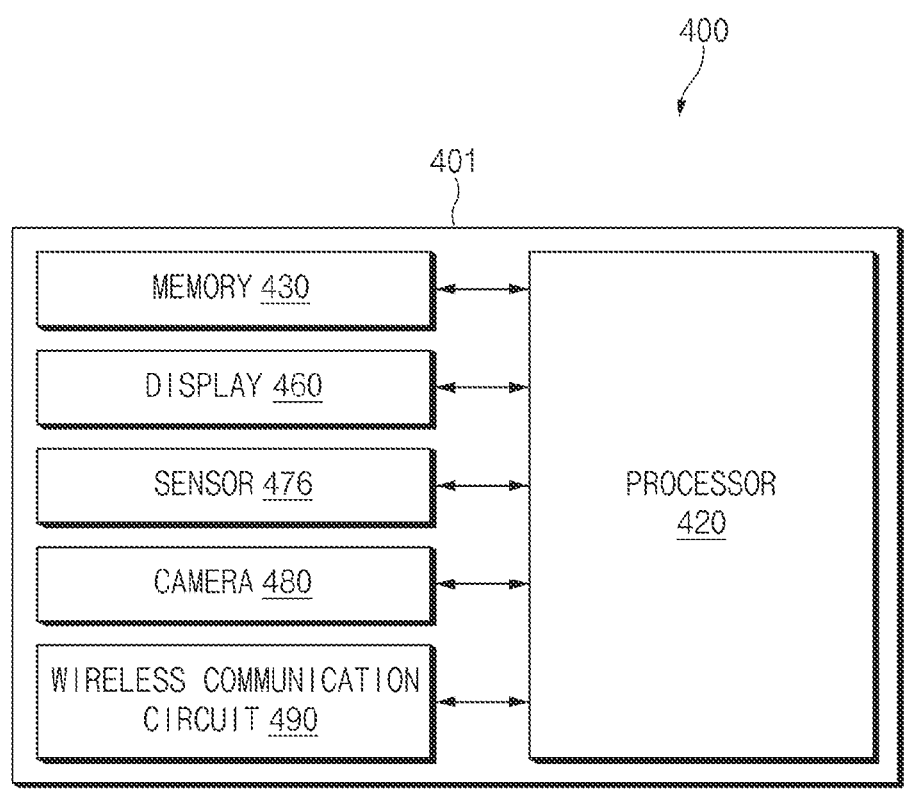
FIG. 4 is a block diagram illustrating example components of an electronic device, according to various embodiments.

FIG. 4 is a block diagram illustrating example components of an electronic device, according to various embodiments.

Hereinafter, a description of a method in which an electronic device displays various user interfaces will be given. In the description of FIGS. 4, 5, 6, 7, 8, 9, 10 and 11, it may be understood that the electronic device is wearable glasses or AR glasses. However, various embodiments of the disclosure are not limited thereto.

According to various embodiments of the disclosure, an electronic device 401 (e.g., the electronic device 101 of FIG. 1 or the electronic device 201 of FIG. 2) may include a processor (e.g., including processing circuitry) 420 (e.g., the processor 120 in FIG. 1), a memory 430 (e.g., the memory 130 in FIG. 1), a display 460 (e.g., the display module 160 in FIG. 1), a sensor 476 (e.g., the sensor module 176 of FIG. 1), a camera 480 (e.g., the camera module 180 of FIG. 1), and/or a wireless communication circuit 490 (e.g., the wireless communication module 192 of FIG. 1). Components of the electronic device 401 illustrated in FIG. 4 are examples, and may further include components not shown, or may not include at least part of illustrated components. For example, the electronic device 401 may further include an audio module (e.g., the audio module 170 of FIG. 1).

According to an embodiment, the processor 420 may be operatively connected to the memory 430, the display 460, the sensor 476, the camera 480, and/or the wireless communication circuit 490. The memory 430 may store one or more instructions that, when executed, cause the processor 420 to perform various operations of the electronic device 401.

According to an embodiment, the display 460 may display various user interfaces and may provide a user with the various user interfaces. The display 460 may be referred to as a "transparent display". For example, the various user interfaces displayed on the display 460 may include a notification message and at least one graphic user interface (GUI) corresponding to an application execution screen. The display 460 may be divided into a plurality of areas. The display 460 may display different user interfaces or different GUIs in the plurality of areas under the control of the processor 420. The division of areas of the display 460 may be the division of logical areas. For example, the display 460 may be divided based on a specified angle with respect to a direction that the user faces. The processor 420 may display different user interfaces or different GUIs in areas of the display 460, respectively. Alternatively, the processor 420 may terminate the display of a user interface or a GUI in one area. For example, the specified angle may be a predetermined angle or an angle set by the user. Hereinafter, the description of the division of areas of the display 460 may be disclosed in more detail with reference to FIG. 5.

According to an embodiment, the sensor 476 may include various types of sensors. The electronic device 401 may identify and/or determine various pieces of information through data obtained using the sensor 476. For example, the sensor 476 may include an image sensor. The processor 420 may capture a surrounding image of a user wearing the electronic device 401 using an image sensor. For example, the image sensor may be disposed at a location adjacent to the user's eyes, and may capture an external environment, which is identical to or similar to an external environment in a direction that the user faces. The processor 420 may analyze the captured image using the image sensor and may obtain information associated with at least one object included in the image. As another example, the sensor 476 may further include an acceleration sensor, a tilt sensor, a gyro sensor, a 3-axis magnetic sensor, and/or an inertial measurement unit (IMU). The processor 420 may obtain motion information of the electronic device 401 using the sensor 476. For example, the motion information of the electronic device 401 may include a movement speed. The movement speed may be referred to as a "movement speed" of a user wearing the electronic device 401. The processor 420 may display various user interfaces based on the movement speed. As another example, the motion information may further include at least one of direction information, tilt information, location information (e.g., GPS coordinate data information, region information, building information, and/or information about a location change amount during a specified time), and altitude information of the electronic device 401. The motion information may further include the user's biometric information (e.g., body temperature information, pulse information, and/or sweat output information) or the user's eye tracking information (e.g., pupil recognition information, eye blink frequency information, eye blink speed information, and/or gaze direction information). The user information obtained using the sensor 476 is not limited to the above-described examples. For example, the user information may further include one of voice information uttered by the user or pressure information applied to a nose pad of the electronic device 401. When it is determined that the movement speed of the electronic device 401 exceeds a first speed (e.g., 3 km/h), the processor 420 may change display locations and/or display states of at least one or more user interfaces and then may display the changed result. When it is determined that the movement speed of the electronic device 401 exceeds a second speed (e.g., 7 km/h), the processor 420 may terminate the display of a user interface. As another example, when the movement speed of the electronic device 401 exceeds the second speed, the processor 420 may not display the user interface from the first.

According to an embodiment, the camera 480 may obtain at least one image corresponding to an external environment. The processor 420 may identify information associated with objects included in at least one image obtained using the camera 480. For example, the processor 420 may identify the number of specified external objects included in the at least one image. When it is determined that the number of specified external objects exceeds a specified value, the processor 420 may terminate the display of the user interface. For example, the specified external object may include a person, a car, and/or a building. The specified value corresponding to the number of external objects may be a predetermined value or a value set by the user. The processor 420 may identify a correlation between the specified external object and the electronic device 401 using information associated with the specified external object and motion information obtained using the sensor 476. The processor 420 may identify the correlation. When it is determined that the correlation satisfies a specified condition, the processor 420 may terminate the display of the user interface. For example, the correlation may include information associated with at least one of a relative speed of a specified external object with respect to a user, a movement direction, or a separation distance between the specified external object and the user.

According to an embodiment, the wireless communication circuit 490 may include circuitry configured to perform a communication function between the electronic device 401 and an external electronic device (e.g., the electronic device 102 or 104 or the server 108 in FIG. 1). For example, the electronic device 401 may perform short-range communication (e.g., wireless LAN (Wi-Fi), Near Field Communication (NFC), Bluetooth, Bluetooth Low Energy (BLE), Zigbee, Wi-Fi Direct (WFD), or Ultra wideband (UWB)) through the wireless communication circuit 490. The electronic device 401 may transmit and receive data with the external electronic device through the wireless communication circuit 490. For example, the electronic device 401 may receive user information from the external electronic device through a wireless communication circuit. The user information may be motion information of the user obtained by the external electronic device using at least one sensor. The external electronic device may obtain the user's motion information using at least one sensor and may transmit the motion information to the electronic device 401. The processor 420 may determine whether to display a user interface on the display 460, based on the received user information. For example, the electronic device 401 may transmit various pieces of information (e.g., movement speed information of the electronic device 401, direction information of the electronic device 401, tilt information of the electronic device 401, GPS coordinate data information of the electronic device 401, region information, building information, location change amount information during a specified time, information about a user's body temperature, pulse information, or sweat output information) obtained using the sensor 476 to the external electronic device based on short-distance communication. The external electronic device may generate data associated with a frame of a user interface to be displayed on the electronic device 401 using information, which is received from the electronic device 401 based on short-range communication, and then may transmit the generated data to the electronic device 401. The electronic device 401 may display various user interfaces based on the received data.

Figure 5:
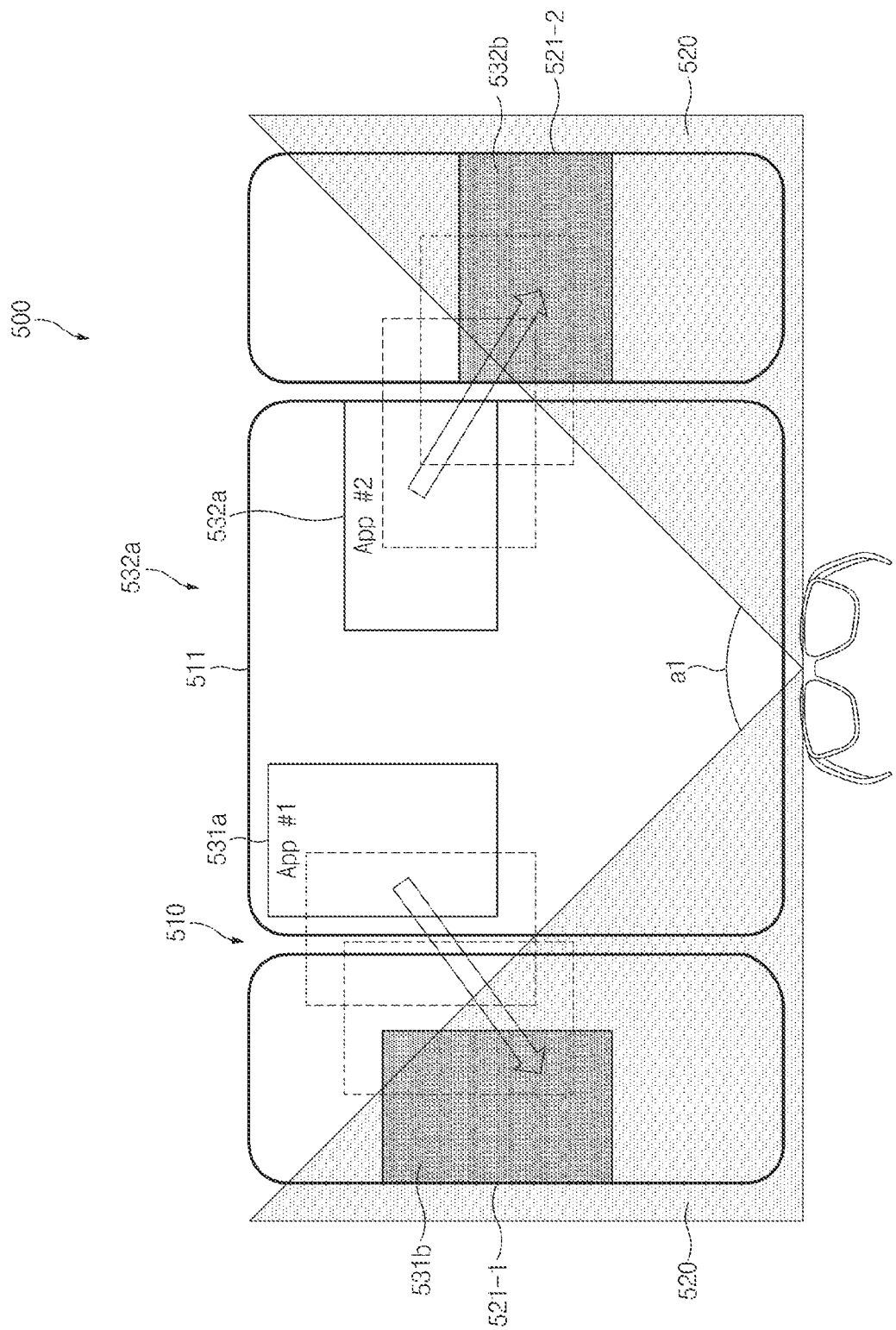
FIG. 5 is a diagram illustrating an example display screen of a display including a plurality of areas, according to various embodiments.

FIG. 5 is a diagram illustrating an example display screen 500 of a display including a plurality of areas 510, 511, 520, 521-1, and 521-2, according to various embodiments.

According to an embodiment, an electronic device (e.g., the electronic device 101 of FIG. 1 or the electronic device 201 of FIG. 2) may display a user interface by dividing a display (e.g., the display 460 in FIG. 4) into various areas. The division of areas of the display may be referred to as the division of physical and/or logical area. The electronic device may display different user interfaces or graphic user interfaces (GUIs) in the divided areas, respectively. The electronic device may display the user interfaces or GUIs only in some of the divided areas.

According to an embodiment, the display may include a plurality of areas that are divided based on a specified angle with respect to a direction that a user faces. The specified angle may be a predetermined angle or an angle set by a user. For example, the display may be divided based on a main visual field and a peripheral visual field. In this specification, a visual field refers to a range that is visible without moving the user's eyes when the user gazes at a specific point. Moreover, when watching any object, a person may clearly watch objects that are present in a gaze direction. Even when incompletely watching objects that are present around him/her, the person may perceive the objects. In this case, the former may be referred to as a central visual field or main visual field, and the latter may be referred to as a peripheral visual field. For example, the amount of information capable of being perceived at each point of a visual field is different depending on a person. The visual field may be measured or analyzed in several methods. For example, the display may be divided into a first visual field area 510 including a first visual field angle a1 and a second visual field area 520 excluding the first visual field area 510. The first visual field area 510 may be referred to as a main visual field area, and the second visual field area 520 may be referred to as a peripheral visual field area. As an example, the first visual field angle a1 may be referred to as "60 degrees to 70 degrees", but various embodiments of the disclosure are not limited thereto. FIG. 5 illustrates that a visual field area is divided into two. However, the visual field area may be divided into three or more based on various angles different from the first visual field angle a1.

According to an embodiment, the display may include at least one display area corresponding to a plurality of visual field areas (e.g., the first visual field area 510 and the second visual field area 520). The electronic device may display different user interfaces or GUIs in the plurality of display areas corresponding to the visual field areas, respectively. The electronic device may terminate the display of a user interface or GUI in some of the display areas. For example, the display may include a first area 511 corresponding to the first visual field area 510 and second areas 521-1 and 521-2 corresponding to the second visual field area 520. As compared to the second areas 521-1 and 521-2, the first area 511 may be an area adjacent to a direction that a user faces. Accordingly, it is easier for the user to perceive a user interface displayed in the first area 511 than a user interface displayed in the second area 521. According to an embodiment, the electronic device may display various user interfaces in the first area 511. For example, the electronic device may display a first user interface including at least one GUI corresponding to an application execution screen in the first area 511. For example, the first user interface may include a first GUI 531*a* corresponding to a first application execution screen and a second GUI 532*a* corresponding to a second application execution screen.

According to an embodiment, the electronic device may change a display location of a GUI included in the first user interface, based on changes in various operating states. For example, the electronic device may obtain motion information of the electronic device using a sensor. When it is determined that the motion information satisfies a specified condition, the electronic device may change display locations of the first GUI 531*a* and the second GUI 532*a* from the first area 510 to the second areas 521-1 and 521-2, respectively, and then may display the changed result. For example, a first GUI 531*b*, of which the display location is changed, may be displayed in the (2-1)-th area 521-1, and a second GUI 532*b*, of which the display location is changed, may be displayed in the (2-2)-th area 521-2. As another example, the electronic device may obtain at least one image corresponding to the external environment in a direction, which the user faces, using a camera (e.g., the camera 480 of FIG. 4) and then may change the display state of a GUI based on information associated with a specified external object included in the at least one image. For example, when it is determined that the number of external objects exceeds a specified value, the electronic device may change display locations of the first GUI 531*a* and the second GUI 532*a* (the first GUI 531*b* and the second GUI 532*b*) or may terminate the display of the first user interface. As another example, the electronic device may identify a correlation between an external object and the user using information associated with the external object and the user's motion information. When it is determined that the correlation satisfies a specified condition, the electronic device may change display locations of the first GUI 531*a* and the second GUI 532*a* to the first GUI 531*b* and the second GUI 532*b* or may terminate the display of the first user interface.

FIG. 5 illustrates an operation in which the electronic device changes display locations of GUIs included in a user interface. However, various embodiments of the disclosure are not limited thereto. For example, the electronic device may change display states of GUIs and then may display the changed results. For example, the electronic device may change the transparency, saturation, color, and/or size of at least one GUI, and then may display the changed result. As another example, the electronic device may display only at least part of content included in a GUI.

Figure 6:
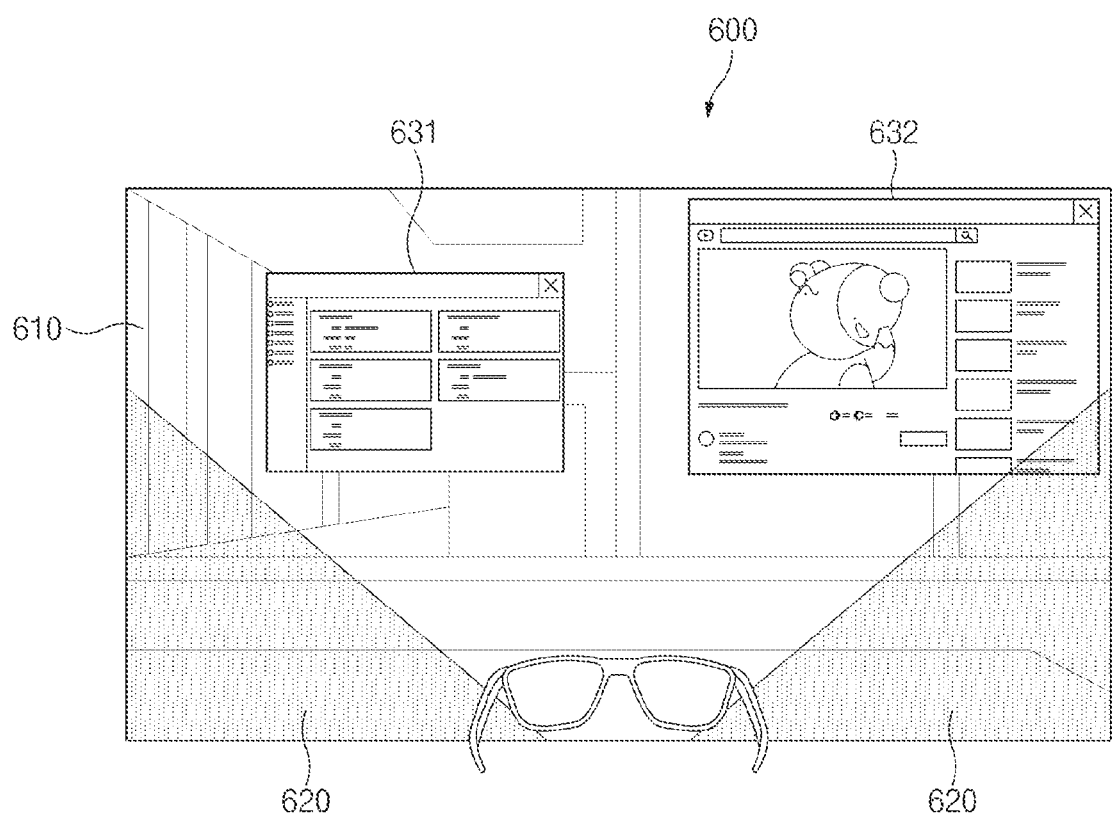
FIG. 6 is a diagram illustrating an example user interface display screen provided by an electronic device, according to various embodiments.

FIG. 6 is a diagram illustrating an example user interface display screen 600 provided by an electronic device, according to various embodiments.

According to an embodiment, an electronic device (e.g., the electronic device 101 of FIG. 1 or the electronic device 201 of FIG. 2) may display various user interfaces on a display (e.g., the display 460 in FIG. 4). For example, the electronic device may divide the display into a plurality of areas (e.g., a first visual field area 610 and a second visual field area 620) based on a specified criterion, and may display different user interfaces in each area based on motion information of the electronic device or external environment information or may display a user interface in only one area.

According to an embodiment, the electronic device may display various user interfaces on the display divided into the first visual field area 610 and the second visual field area 620. The division of the visual field area may be the division of a logical area determined based on a specified angle (e.g., 60 degrees to 70 degrees) with respect to the direction that a user faces. For example, the electronic device may obtain motion information of the electronic device including a movement speed using at least one sensor (e.g., the sensor 476 of FIG. 4). When the movement speed is not greater than a first speed, the electronic device may display at least one GUI (e.g., a first GUI 631 and a second GUI 632) corresponding to an application execution screen in the first visual field area 610 (or the first area 511 of FIG. 5). For example, when the movement speed is not greater than the first speed, the electronic device may identify that the user is stopped. When it is identified that the user is stopped, the user encounters relatively less an unexpected situation (e.g., the collision with an external object) although content is displayed in an area adjacent to a direction that the user faces. Accordingly, it may be determined to display at least one GUI in an area including the first visual field area 610.

Figure 7:
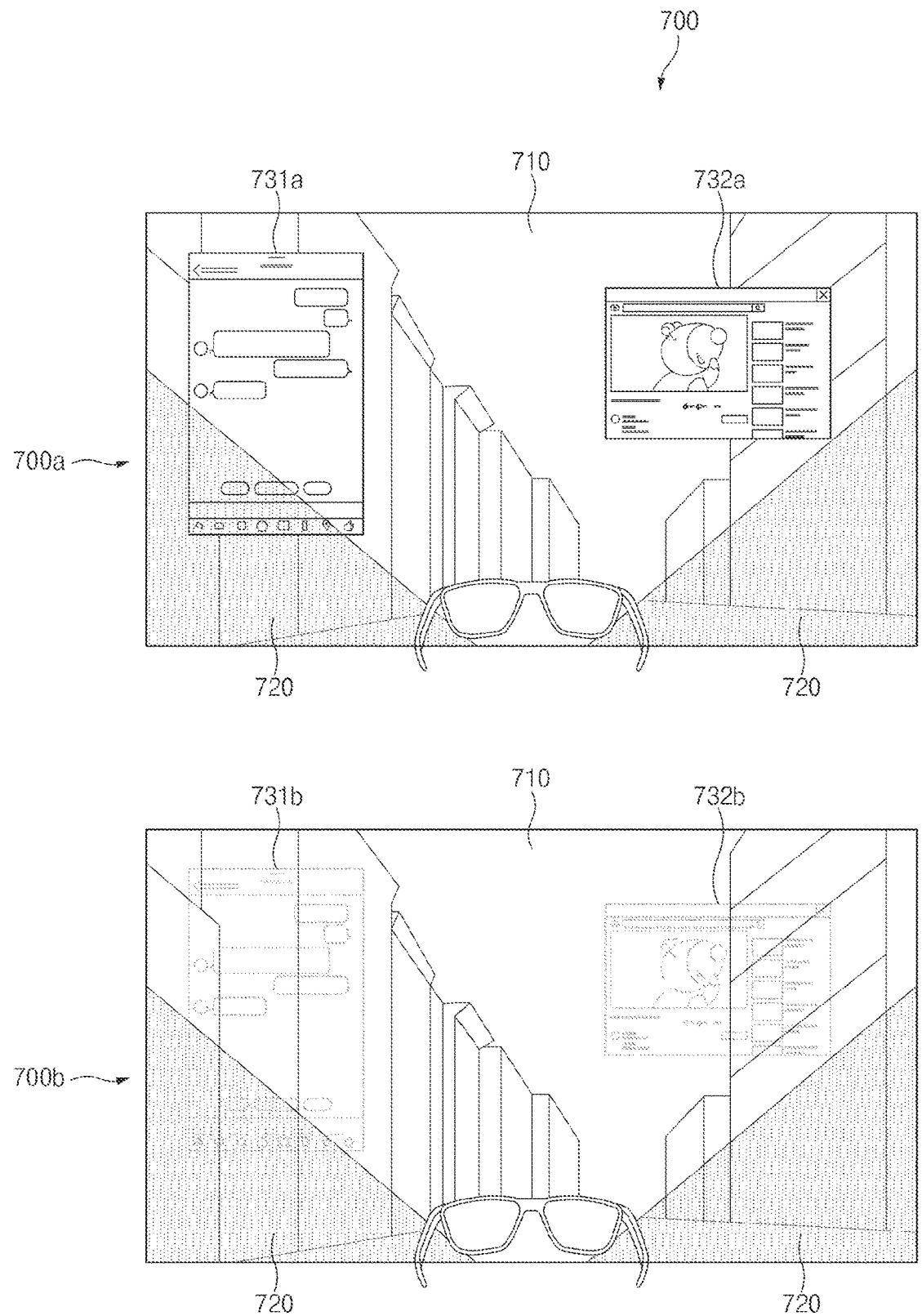
FIG. 7 is a diagram illustrating an example user interface display screen provided by an electronic device, according to various embodiments.

FIG. 7 is a diagram illustrating an example user interface display screen 700 provided by an electronic device, according to various embodiments.

According to an embodiment, an electronic device (e.g., the electronic device 101 of FIG. 1 or the electronic device 201 of FIG. 2) may display various user interfaces including at least one GUI on a display (e.g., the display 460 in FIG. 4). For example, the electronic device may display at least one GUI corresponding to an application execution screen in one area (e.g., a first visual field area 710 or a second visual field area 720) of the display.

Referring to reference number 700*a*, according to an embodiment, the electronic device may display a first GUI 731*a* corresponding to a first application execution screen and a second GUI 732*a* corresponding to a second application execution screen in at least part of the first visual field area 710 or the second visual field area 720.

Referring to reference number 700*b*, according to an embodiment, the electronic device may change display states (e.g., transparency, saturation, color, and/or size) of GUIs included in a user interface based on various pieces of information obtained using a sensor and then may display the changed result. For example, the electronic device may obtain motion information of the electronic device including a movement speed using a sensor (e.g., the sensor 476 of FIG. 4). When it is determined that the movement speed exceeds a first speed (e.g., 3 km/h), the electronic device may display a first GUI 731*b* and a second GUI 732*b*, each of which has the changed transparency. For example, when it is determined that the user's movement speed exceeds the first speed, the electronic device may gradually increase the transparency of each of the first GUI 731*b* and the second GUI 732*b* in response to the continued increase in a movement speed.

FIG. 7 illustrates that the electronic device changes and displays the transparency of a GUI included in a user interface based on a change in a movement speed. However, various embodiments of the disclosure are not limited thereto. For example, the electronic device may obtain at least one image using a camera (e.g., the camera 480 of FIG. 4), may change the transparency of a GUI based on information (e.g., the number of external objects, a movement speed, a movement direction, and/or a location) associated with an external object included in the at least one image, and may display the changed result.

Figure 8:
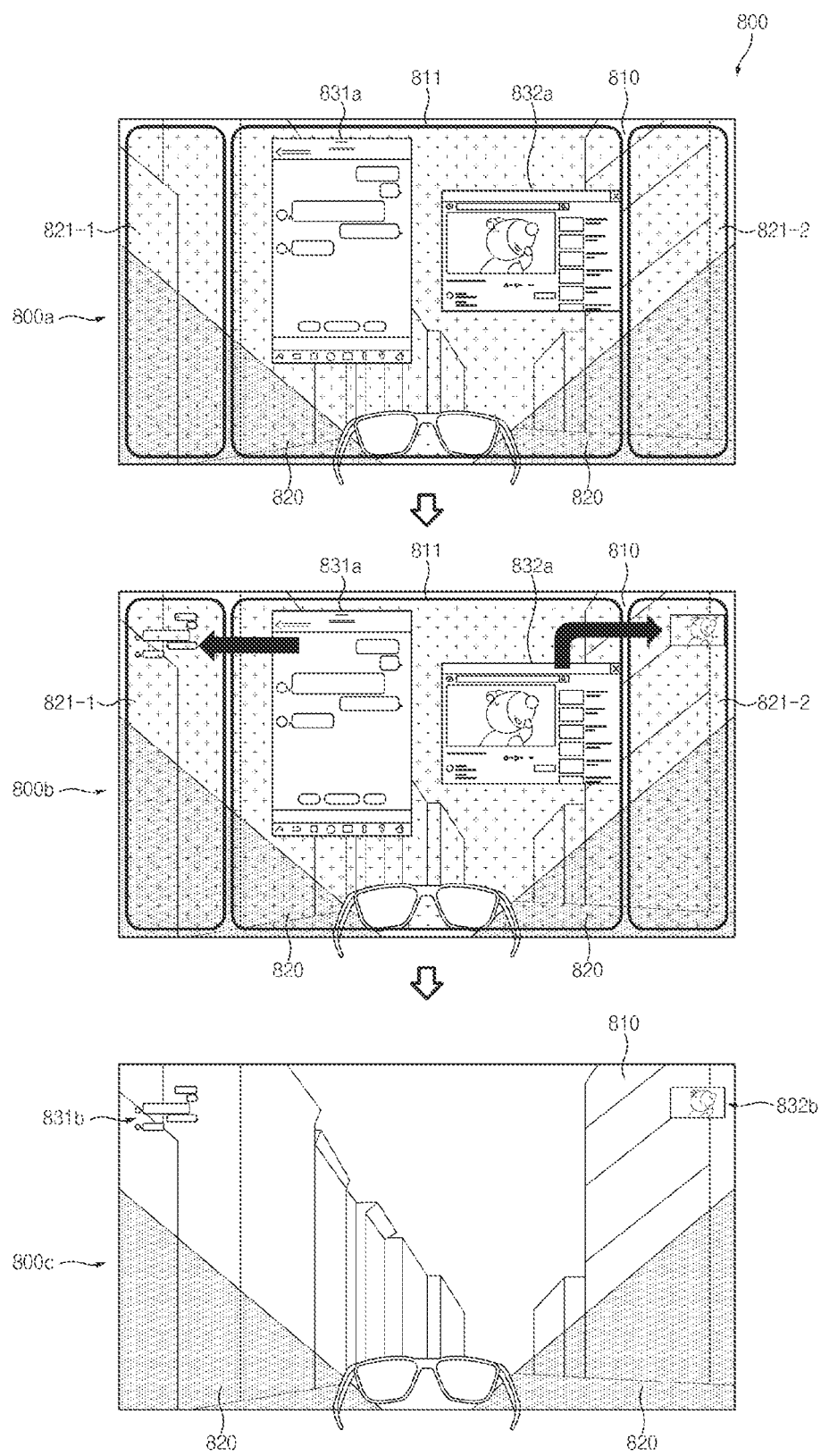
FIG. 8 is a diagram illustrating an example user interface display screen provided by an electronic device, according to various embodiments.

FIG. 8 is a diagram illustrating an example user interface display screen 800 provided by an electronic device, according to various embodiments.

Referring to reference number 800*a*, according to an embodiment, an electronic device (e.g., the electronic device 101 of FIG. 1 or the electronic device 201 of FIG. 2) may display various user interfaces including at least one GUI on a display (e.g., the display 460 in FIG. 4). For example, the electronic device may include an area (e.g., a first visual field area 810 (e.g., a first area 811 corresponding to the first visual field area 510 of FIG. 5 (e.g., the first area 511 of FIG. 5) or a second visual field area 820) of the display. The electronic device may display at least one GUI corresponding to an application execution screen in second areas 821-1 and 821-2 excluding the first area 811. For example, the electronic device may obtain motion information of the electronic device including a movement speed using a sensor (e.g., the sensor 476 of FIG. 4). When the movement speed is not greater than a first speed (e.g., 3 km/h), the electronic device may display at least one GUI (e.g., a first GUI 831*a* corresponding to the first application execution screen and a second GUI 832*a* corresponding to the second application execution screen) in the first area 811 of the display.

Referring to reference number 800*b*, according to an embodiment, when it is determined that a user's motion information or external environment information satisfies a specified condition, the electronic device may change display locations of the first GUI 831*a* and the second GUI 832*a*. For example, when it is determined that the movement speed obtained using a sensor exceeds the first speed, the electronic device may change a display location of the first GUI 831*a* from the first area 811 to a (2-1)-th area 821-1, and may change a display location of the second GUI 832*a* from the first area 811 to a (2-2)-th area 821-2. The electronic device may display the changed results. As another example, the electronic device may obtain at least one image using a camera (e.g., the camera 480 of FIG. 4). When it is determined that information (e.g., the number of external objects, a movement speed, a movement direction, and/or a location) associated with a specified external object included in at least one image satisfies a specified condition (e.g., when it is determined that the number of external objects exceeds a specified value), the electronic device may change a display location of at least one GUI or may terminate the display of the user interface. For example, the specified external object may include a person, a car, and/or a building. According to an embodiment, the electronic device may display at least one GUI by gradually moving a display location of the at least one GUI from the first area 811 toward the second areas 821-1 and 821-2 in response to an increase in the movement speed. In other words, the electronic device may gradually move a display location of at least one GUI to the left or right so as to be away from a direction, which the user faces, and then may display the at least one GUI. According to another embodiment, the electronic device may gradually move a display location of at least one GUI from the second areas 821-1 and 821-2 toward the first area 811 in response to a decrease in the movement speed and then may display the at least one GUI. In other words, the electronic device may gradually move a display location of at least one GUI so as to be adjacent to a direction, which the user faces, and then may display the at least one GUI.

Referring to reference number 800*c*, according to an embodiment, the electronic device may change a display location of at least one GUI and then may display only a part of the at least one GUI. For example, as in reference number 800*b*, the electronic device may respectively change display locations of the first GUI 831*a* and the second GUI 832*a* to the (2-1)-th area 821-1 and the (2-2)-th area 821-2 and then may display only a part 831*b* of the first GUI 831*a* and only a part 832*b* of the second GUI 832*a*. As an example, the first GUI 831*a* may correspond to an execution screen of a messenger application. The first GUI 831*a* may include pieces of content corresponding to various functions (e.g., a chat screen between a user and a dialog counterpart, chat settings, sending attachments, and a function of sending emoticons, and/or voice messages). The part 831*b* of the first GUI 831*a* may correspond to a chat screen between the user and the dialog counterpart. As another example, the second GUI 832*a* may correspond to an execution screen of a video playback application. The second GUI 832*a* may include pieces of contents corresponding to various functions (e.g., a video playback screen, at least one thumbnail, and/or information about a video being played). The part 832*b* of the second GUI 832*a* may correspond to a video playback screen.

Figure 9:
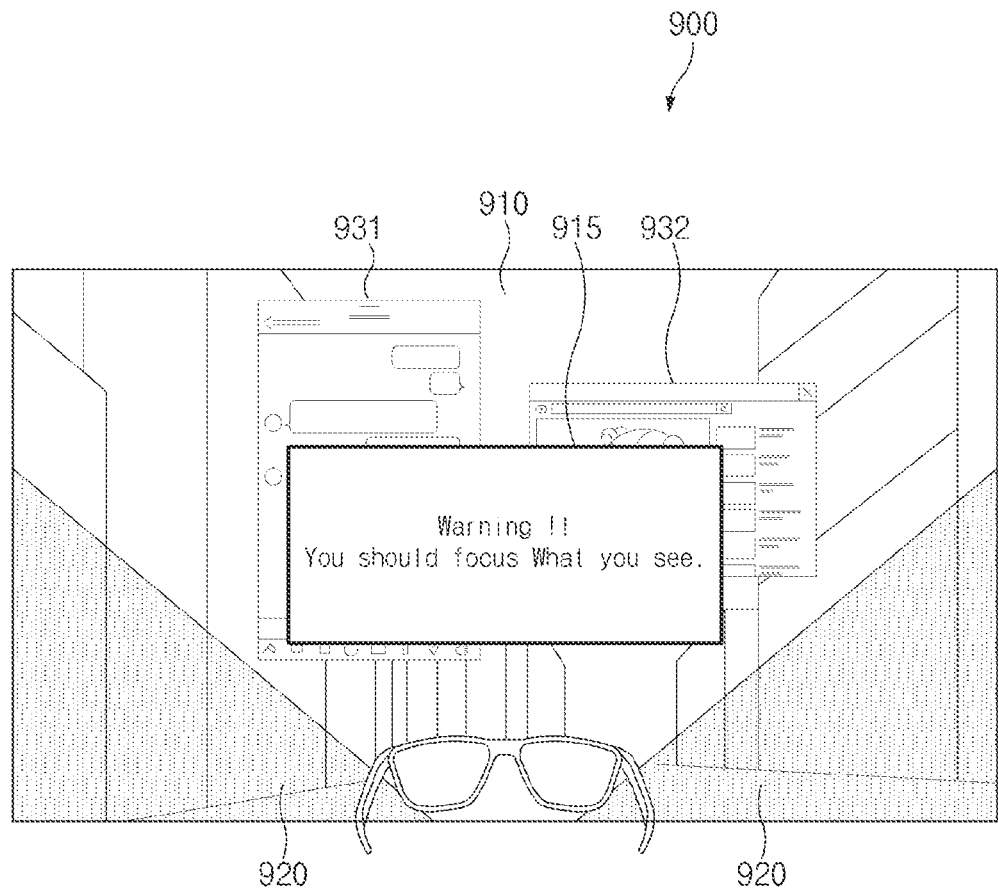
FIG. 9 is a diagram illustrating an example user interface display screen provided by an electronic device, according to various embodiments.

FIG. 9 is a diagram illustrating an example user interface display screen 900 provided by an electronic device, according to various embodiments.

According to an embodiment, an electronic device (e.g., the electronic device 101 of FIG. 1 or the electronic device 201 of FIG. 2) may display various user interfaces in one area (e.g., a first visual field area 910 or a second visual field area 920) of a display. For example, the electronic device may display a first user interface including a first GUI 931 corresponding to a first application execution screen and a second GUI 932 corresponding to a second application execution screen in the first visual field area 910 of the display.

According to an embodiment, while displaying the first user interface, the electronic device may obtain motion information of the electronic device or information associated with an external environment. For example, the electronic device may obtain motion information of the electronic device including a movement speed using a sensor (e.g., the sensor 476 of FIG. 4) or may obtain at least one image corresponding to an external environment in a direction, which a user faces, using a camera (e.g., the camera 480 of FIG. 4). For example, when it is determined that the movement speed exceeds a first speed (e.g., 3 km/h) and/or when it is determined that the number of specified external objects included in the at least one image exceeds a specified value, the electronic device may further display a second user interface 915 by overlaying the second user interface 915 on the first user interface displayed in one area of the display. The electronic device may provide notification content including external object information, which is present on the user's movement path, and/or information indicating that there is a possibility of collision when a user continues to move in a current state, by displaying the second user interface 915.

Figure 10:
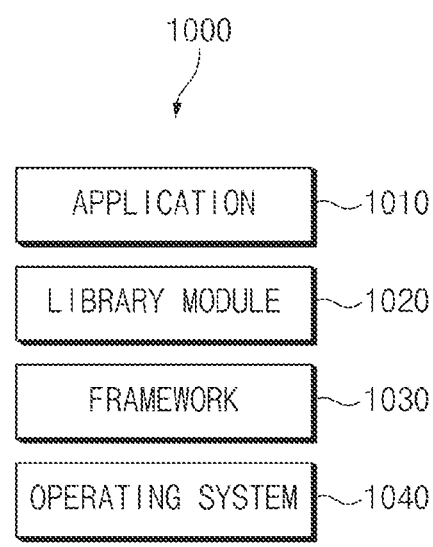
FIG. 10 is a block diagram illustrating an example software layer of an electronic device, according to various embodiments.

FIG. 10 is a block diagram 1000 illustrating an example software layer of an electronic device, according to various embodiments.

Referring to FIG. 10, according to an embodiment, a processor (e.g., the processor 420 of FIG. 4) may load a program (e.g., the program 140 of FIG. 1, e.g., including various executable program instructions) including an application 1010, a library module 1020, a framework 1030, and/or an operating system 1040 onto a memory (e.g., the memory 130 of FIG. 1) and may execute the program. For example, the program may include a plurality of components for controlling one or more resources of an electronic device (e.g., the electronic device 101 of FIG. 1 or the electronic device 201 of FIG. 2). For example, at least part of the program may be preloaded on an electronic device when the electronic device is being manufactured. Alternatively, when the electronic device is used by a user, at least part of the program may be downloaded from an external electronic device (e.g., the electronic device 102 or 104) or a server (e.g., the server 108 of FIG. 1) and may be updated.

According to an embodiment, the application 1010 may include at least one of a home application, a dialer application, a browser application, a camera application, an alarm application, a contact application, a speech recognition application, an email application, a calendar application, a media player application, a messenger application, an album application, a watch application, a health application, and an environment information application. For example, the application 1010 may execute a plurality of applications in various modes based on the criterion determined by a stage of the framework 1030. For example, the application 1010 may provide a user interface including different types and/or functions based on information determined based on whether a specified condition is satisfied in the stage of the framework 1030. The condition determined in the stage of the framework 1030 may be a condition associated with the movement of an electronic device and/or a condition associated with the user's biometric information. A user interface provided by the application 1010 may be changed based on whether the condition is satisfied.

According to an embodiment, the library module 1020 may be referred to as a "software module" that may be used by a compiler to add new functions through a programming language while the program is running. For example, the library module 1020 may include software development kit (SDK), application programming interface (API), and/or runtime. FIG. 10 illustrates that the library module 1020 and the framework 1030 are separate components, but not limited thereto. The library module 1020 may be included in the framework 1030.

According to an embodiment, the framework 1030 may provide various functions to the application 1010 such that a function and/or information provided from one or more resources included in the electronic device is able to be used by the application 1010. For example, in the stage of the framework 1030, the electronic device may determine whether information obtained using a plurality of components satisfies a specified condition. For example, the electronic device may determine whether the user's motion information satisfies a specified condition, in the stage of the framework 1030. As another example, the electronic device may determine whether information associated with a specified external object adjacent to the user satisfies a specified condition, in the stage of the framework 1030. In detail, the electronic device may process various information obtained through a sensor in the stage of the framework 1030. For example, the electronic device may identify a state of the electronic device and/or a state of the user through motion information of the electronic device obtained through the sensor in the stage of the framework 1030. As another example, the electronic device may identify an external environment state of the electronic device through at least one image obtained through the camera in the stage of the framework 1030. The electronic device may change a user interface (e.g., a user interface associated with an AR function) provided in stage of the application 1010 in various shapes using the identification result in the stage of the framework 1030 described above and then may display the changed result.

According to an embodiment, the operating system 1040 may control the management (e.g., allocating or retrieving) of one or more system resources (e.g., a process, a memory, or a power) of the electronic device. Additionally or alternatively, the operating system 1040 may include one or more driver programs for driving other hardware devices (e.g., the input device 150, the sound output device 155, the display module 160, the audio module 170, the sensor module 176, the interface 177, the haptic module 179, the camera module 180, the power management module 188, the battery 189, the communication module 190, the subscriber identification module 196, or the antenna module 197 in FIG. 1) of the electronic device. For example, in the stage of the operating system 1040, the electronic device may obtain various pieces of information by driving a sensor or camera. For example, the electronic device may obtain motion information of the user wearing the electronic device by driving the sensor. As another example, at least one image corresponding to an external environment may be obtained by driving the camera.

According to an embodiment, the electronic device may repeatedly perform the operation described in FIG. 10 based on a specified period. For example, the electronic device may repeatedly perform the operation described in FIG. 10 based on a period set by the user or a predetermined period, or may continuously perform the operation regardless of a period.

Figure 11:
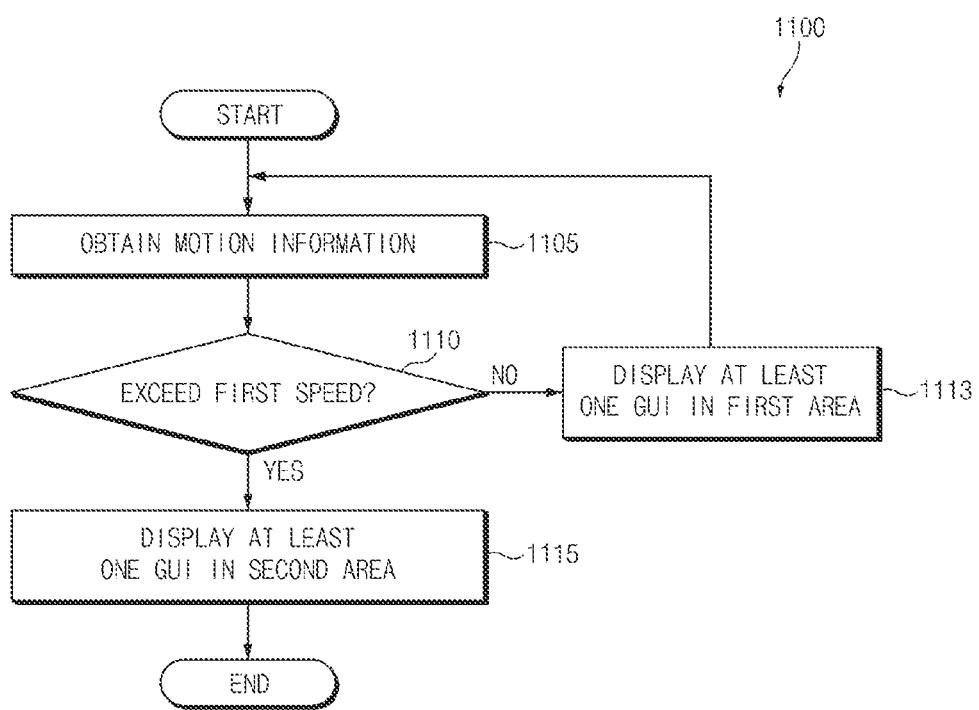
FIG. 11 is a flowchart illustrating an example operation of an electronic device, according to various embodiments.

FIG. 11 is a flowchart 1100 illustrating an example operation of an electronic device, according to various embodiments.

According to an embodiment, an electronic device (e.g., the electronic device 101 of FIG. 1 or the electronic device 201 of FIG. 2) may perform operations of FIG. 11. For example, a processor of the electronic device (e.g., the processor 120 of FIG. 1) may be configured to perform operations of FIG. 11 when instructions stored in a memory (e.g., the memory 130 of FIG. 1) are executed.

In operation 1105, the electronic device may obtain motion information. For example, the electronic device may obtain the motion information of the electronic device including a movement speed using at least one sensor (e.g., the sensor 476 of FIG. 4).

In operation 1110, the electronic device may determine whether the movement speed exceeds a first speed (e.g., 3 km/h). The electronic device may obtain the motion information at a specified period or continuously, and may determine whether the movement speed satisfies a specified condition.

When it is determined that the movement speed exceeds the first speed (e.g., operation 1110—Yes) in operation 1110, the electronic device may perform operation 1115. For example, when the movement speed exceeds the first speed, the electronic device may determine that a user is walking.

When it is determined that the movement speed does not exceed the first speed (e.g., operation 1110—No) in operation 1110, the electronic device may perform operation 1113. For example, when the movement speed is not greater than the first speed, the electronic device may determine that the user is stopped.

In operation 1113, the electronic device may display a user interface including at least one GUI in a first area (e.g., the first area 511 of FIG. 5). For example, the first area may be referred to as an area corresponds to a first visual field area (e.g., the first visual field area 510 in FIG. 5) including an area having a specified angle (e.g., 60 degrees to 70 degrees) with respect to a direction that the user faces. The at least one GUI may be referred to as GUIs corresponding to execution screens of applications executed by the electronic device.

In operation 1115, the electronic device may display a user interface including at least one GUI in a second area (e.g., the second areas 521-1 and 521-2 of FIG. 5). For example, the second area may be referred to as an area corresponds to a second visual field area (e.g., the second visual field area 520 in FIG. 5) excluding an area having a specified angle (e.g., 60 degrees to 70 degrees) with respect to the direction that the user faces. For example, when the movement speed increases, the electronic device may gradually move at least one or more GUIs from the first area to the second area in response to the increase in the movement speed and then may display the at least one or more GUIs. As another example, the electronic device may change display states (e.g., transparency, saturation, color, and/or size) of at least one or more GUIs displayed in the second area and then may display the at least one or more GUIs. For example, when the movement speed increases, the electronic device may gradually increase the transparency of at least one or more GUIs in response to the increase in the movement speed and then may display the at least one or more GUIs. As another example, the electronic device may overlay the second user interface (e.g., the second user interface 915 of FIG. 9) on the user interface being displayed, and then may further display the overlaid result. The electronic device may provide notification content including external object information, which is present on the user's movement path, and/or information indicating that there is a possibility of collision when a user continues to move in a current state, by displaying the second user interface.

FIG. 11 illustrates that the electronic device determines whether the movement speed satisfies a specified criterion, but is not limited thereto. For example, the electronic device may determine whether the movement speed satisfies the specified criterion and may simultaneously determine whether the user's external environment satisfies the specified condition. For example, the electronic device may obtain at least one image corresponding to the external environment in the direction, which the user faces, using a camera (e.g., the camera 480 in FIG. 4) and then may determine whether information (e.g., the number of external objects, a movement speed, a movement direction, and/or a location) associated with an external object included in the at least one image satisfies a specified condition. The electronic device may perform an operation of determining whether to display a user interface described in FIG. 11, based on the information associated with the external object.

Figure 12:
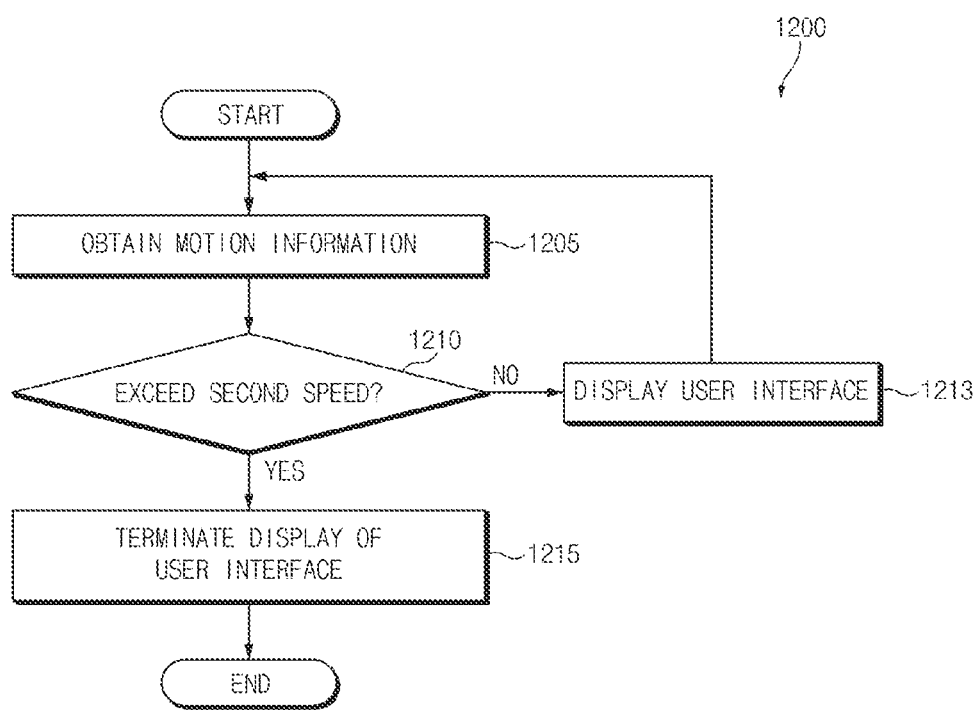
FIG. 12 is a flowchart illustrating an example operation of an electronic device, according to various embodiments.

FIG. 12 is a flowchart 1200 illustrating an example operation of an electronic device, according to various embodiments.

According to an embodiment, an electronic device (e.g., the electronic device 101 of FIG. 1 or the electronic device 201 of FIG. 2) may perform operations of FIG. 12. For example, a processor of the electronic device (e.g., the processor 120 of FIG. 1) may be configured to perform operations of FIG. 12 when instructions stored in a memory (e.g., the memory 130 of FIG. 1) are executed.

In operation 1205, the electronic device may obtain motion information. For example, the electronic device may obtain the motion information of the electronic device including a movement speed using at least one sensor (e.g., the sensor 476 of FIG. 4).

In operation 1210, the electronic device may determine whether the movement speed exceeds a second speed (e.g., 7 km/h). The electronic device may obtain the motion information at a specified period or continuously, and may determine whether the movement speed satisfies a specified condition.

When it is determined that the movement speed exceeds the second speed (e.g., operation 1210—Yes) in operation 1210, the electronic device may perform operation 1215. For example, when a user's movement speed exceeds the second speed, the electronic device may determine that the user is running.

When it is determined that the movement speed does not exceed the second speed (e.g., operation 1210—No) in operation 1210, the electronic device may perform operation 1213. For example, when the movement speed is not greater than the second speed, the electronic device may determine that the user is walking or stopped.

In operation 1213, the electronic device may display various user interfaces on one area of the display. For example, the electronic device may display a user interface including a GUI having different locations and display states based on whether the movement speed exceeds the first speed. The description of the operation in which the electronic device displays various user interfaces based on the first speed may be replaced with the description of FIG. 11 described above.

In operation 1215, the electronic device may terminate the display of the user interface. For example, when the movement speed exceeds the second speed, the ability to perceive surrounding situations is reduced due to the user interface displayed on the display. Accordingly, an unexpected situation (e.g., the collision with an external object) may occur. Accordingly, the electronic device may terminate the display of the user interface on the display.

FIG. 12 illustrates that the electronic device determines whether the user's movement speed satisfies a specified criterion, but is not limited thereto. For example, as described above with reference to FIG. 11, the electronic device may determine whether the user's movement speed satisfies the specified criterion and may simultaneously determine whether the user's external environment satisfies the specified condition. For example, the electronic device may obtain at least one image corresponding to the external environment in the direction, which the user faces, using a camera (e.g., the camera 480 in FIG. 4) and then may determine whether information (e.g., the number of external objects, a movement speed, a movement direction, and/or a location) associated with an external object included in the at least one image satisfies a specified condition. The electronic device may perform an operation of determining whether to display a user interface described in FIG. 12, based on the information associated with the external object.

According to various example embodiments, an electronic device may include: a camera, a transparent display including a first area corresponding to a first visual field area and a second area corresponding to a second visual field area, at least one sensor, a processor, and a memory operatively connected to the processor.

According to an embodiment, The memory may store one or more instructions that, when executed, cause the processor to: control the electronic device to obtain motion information of the electronic device including a movement speed using the at least one sensor, to control the display to display a first user interface including at least one graphic user interface (GUI) corresponding to an application execution screen in the first area of the transparent display based on the movement speed not being greater than a first speed, and to control the display to display the at least one GUI in the second area based on the movement speed exceeding the first speed.

According to an example embodiment, the one or more instructions may, when executed, cause the processor to control the display to display the at least one GUI included in the first user interface in the first area and to gradually move a display location of the at least one GUI from the first area toward the second area in response to an increase in the movement speed and to control the display to display the at least one GUI based on determining that the movement speed exceeds the first speed.

According to an example embodiment, the one or more instructions may, when executed, cause the processor to control the display to display the at least one GUI included in the first user interface in the first area and to gradually increase transparency of the at least one GUI in response to an increase in the movement speed and to control the display to display the at least one GUI based on determining that the movement speed exceeds the first speed.

According to an example embodiment, the at least one GUI may include a first GUI and a second GUI. The one or more instructions, when executed, cause the processor to control the display to display the first GUI and the second GUI in the first area and to display a part of the first GUI and a part of the second GUI in the second area based on determining that the movement speed exceeds the first speed.

According to an example embodiment, the one or more instructions may, when executed, cause the processor to control the display to overlay a second user interface including a notification message on the first user interface and further to control the display to display the overlaid result in the first area of the display based on determining that the movement speed exceeds the first speed.

According to an example embodiment, the motion information obtained using the at least one sensor may further include at least one of direction information, tilt information, altitude information, or location information of the electronic device.

According to an example embodiment, the one or more instructions may, when executed, cause the processor to control the display to display the at least one GUI included in the first user interface in the first area, to identify a specified external object included in an image obtained using the camera, and control the display to terminate a display of the first user interface based on the number of specified external objects exceeding a specified value.

According to an example embodiment, the one or more instructions may, when executed, cause the processor to identify a correlation between the specified external object and the electronic device using information associated with the specified external object and the motion information obtained using the at least one sensor and to control the display to terminate the display of the first user interface based on determining that the correlation satisfies a specified condition.

According to an example embodiment, the one or more instructions may, when executed, cause the processor to control the display to display the first user interface in the first area or the second area and to control the display to terminate a display of the first user interface based on determining that the movement speed exceeds a second speed.

According to an example embodiment, the electronic device may further include a wireless communication circuit. The one or more instructions may, when executed, cause the processor to receive the motion information of the electronic device from an external electronic device through the wireless communication circuit and to determine whether to display the first user interface, based on the motion information.

According to various example embodiments, a method in which an electronic device displays a user interface may include: obtaining motion information of the electronic device including a movement speed using at least one sensor, displaying a first user interface including at least one GUI corresponding to an application execution screen in a first area based on the movement speed not being greater than a first speed, and displaying the at least one GUI in the second area based on the movement speed exceeding the first speed.

According to an example embodiment, the method in which an electronic device displays a user interface may further include: displaying the at least one GUI included in the first user interface in the first area and gradually moving a display location of the at least one GUI included in the first user interface from the first area toward the second area in response to an increase in the movement speed and displaying the at least one GUI based on determining that the movement speed exceeds the first speed.

According to an example embodiment, the method in which an electronic device displays a user interface may further include displaying the at least one GUI included in the first user interface in the first area and gradually increasing transparency of the at least one GUI included in the first user interface in response to an increase in the movement speed and displaying the at least one GUI based on determining that the movement speed exceeds the first speed.

According to an example embodiment, the at least one GUI may include a first GUI and a second GUI. The method in which an electronic device displays a user interface may further include displaying the first GUI and the second GUI in the first area and displaying a part of the first GUI and a part of the second GUI in the second area based on determining that the movement speed exceeds the first speed.

According to an example embodiment, the method in which an electronic device displays a user interface may further include displaying the at least one GUI included in the first user interface in the first area and overlaying a second user interface including a notification message on the first user interface and further displaying the overlaid result in the first area of the display based on determining that the movement speed exceeds the first speed.

According to an example embodiment, the motion information obtained using the at least one sensor may further include at least one of direction information, tilt information, altitude information, or location information of the electronic device.

According to an example embodiment, the method in which an electronic device displays a user interface may further include displaying the at least one GUI included in the first user interface in the first area and identifying a specified external object included in an image obtained using a camera and terminating a display of the first user interface based on determining that the number of specified external objects exceeds a specified value.

According to an example embodiment, the identifying of the specified external object included in the image obtained using the camera may include analyzing a correlation between the specified external object and the electronic device using information associated with the specified external object and the motion information obtained using the at least one sensor and terminating the display of the first user interface based on determining that the correlation satisfies a specified condition.

According to an example embodiment, the method in which an electronic device displays a user interface may further include displaying the first user interface in the first area or the second area and terminating a display of the first user interface based on determining that the movement speed exceeds a second speed.

According to an example embodiment, the method in which an electronic device displays a user interface may further include receiving user information from an external electronic device through a wireless communication circuit and determining whether to display the first user interface, based on the user information.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
   a camera;
   a transparent display including a first area corresponding to a first visual field area and a second area corresponding to a second visual field area, wherein the first area is different from the second area;
   at least one sensor;
   at least one processor; and
   a memory operatively connected to the at least one processor, wherein the at least one processor is configured to:
   control the electronic device to obtain motion information of the electronic device including a movement speed using the at least one sensor;
   based on the movement speed not being greater than a first speed, control the display to display a first user interface including at least one graphic user interface (GUI) corresponding to an application execution screen in the first area of the transparent display; and
   based on the movement speed exceeding the first speed, control the display to display the at least one GUI included in the first user interface in the second area,
   wherein the first visual field area is an area including a specified angle with respect to a direction that the user is to face, and the second visual field area is an area excluding the first visual field area with respect to the direction that the user is to face.

2. The electronic device of claim 1, wherein the one or more instructions, when executed, cause the processor to:
   control the display to display the at least one GUI included in the first user interface in the first area; and
   based on determining that the movement speed exceeds the first speed, gradually move a display location of the at least one GUI from the first area toward the second area in response to an increase in the movement speed and display the at least one GUI.

3. The electronic device of claim 1, wherein the one or more instructions, when executed, cause the processor to:
   control the display to display the at least one GUI included in the first user interface in the first area; and
   based on determining that the movement speed exceeds the first speed, gradually increase transparency of the at least one GUI in response to an increase in the movement speed and display the at least one GUI.

4. The electronic device of claim 1, wherein the at least one GUI includes a first GUI and a second GUI, and wherein the one or more instructions, when executed, cause the processor to:
   control the display to display the first GUI and the second GUI in the first area; and
   based on determining that the movement speed exceeds the first speed, display a part of the first GUI and a part of the second GUI in the second area.

5. The electronic device of claim 1, wherein the one or more instructions, when executed, cause the processor to:
   based on determining that the movement speed exceeds the first speed, control the display to overlay a second user interface including a notification message on the first user interface and to further display the overlaid result in the first area of the display.

6. The electronic device of claim 1, wherein the motion information obtained using the at least one sensor further includes at least one of direction information, tilt information, altitude information, or location information of the electronic device.

7. The electronic device of claim 1, wherein the one or more instructions, when executed, cause the processor to:
   control the display to display the at least one GUI included in the first user interface in the first area;
   identify a specified external object included in an image obtained using the camera; and
   based on the number of specified external objects exceeding a specified value, control the display to terminate a display of the first user interface.

8. The electronic device of claim 7, wherein the one or more instructions, when executed, cause the processor to:
   identify a correlation between the specified external object and the electronic device using information associated with the specified external object and the motion information obtained using the at least one sensor; and
   based on determining that the correlation satisfies a specified condition, control the display to terminate the display of the first user interface.

9. The electronic device of claim 1, wherein the one or more instructions, when executed, cause the processor to:
   control the display to display the first user interface in the first area or the second area; and
   based on determining that the movement speed exceeds a second speed, control the display to terminate a display of the first user interface.

10. The electronic device of claim 1, further comprising:
    a wireless communication circuit,
    wherein the one or more instructions, when executed, cause the processor to:
    control the wireless communication circuit to receive the motion information of the electronic device from an external electronic device; and
    determine whether to display the first user interface, based on the motion information.

11. A method for displaying a user interface of an electronic device comprising a transparent display including a first area corresponding to a first visual field area and a second area corresponding to a second visual field area, the method comprising:
    obtaining motion information of the electronic device including a movement speed using at least one sensor;
    based on the movement speed not being greater than a first speed, displaying a first user interface including at least one GUI corresponding to an application execution screen in the first area; and
    based on the movement speed exceeding the first speed, displaying the at least one GUI included in the first user interface in the second area,
    wherein the first area is different from the second area, and wherein the first visual field area is an area having a specified angle with respect to a direction that the user faces, and the second visual field area is an area excluding the first visual field area with respect to the direction that the user faces.

12. The method of claim 11, further comprising:
displaying the at least one GUI included in the first user interface in the first area; and
based on determining that the movement speed exceeds the first speed, gradually moving a display location of the at least one GUI included in the first user interface from the first area toward the second area in response to an increase in the movement speed and displaying the at least one GUI.

13. The method of claim 11, further comprising:
displaying the at least one GUI included in the first user interface in the first area; and
based on determining that the movement speed exceeds the first speed, gradually changing a transparency of the at least one GUI included in the first user interface in response to a change in the movement speed and displaying the at least one GUI.

14. The method of claim 11, wherein the at least one GUI includes a first GUI and a second GUI,
the method further comprising:
displaying the first GUI and the second GUI in the first area; and
based on determining that the movement speed exceeds the first speed, displaying a part of the first GUI and a part of the second GUI in the second area.

15. The method of claim 14, further comprising:
displaying the at least one GUI included in the first user interface in the first area; and
based on determining that the movement speed exceeds the first speed, overlaying a second user interface including a notification message on the first user interface and further displaying the overlaid result in the first area of the display.

16. The method of claim 11, wherein the motion information obtained by using the at least one sensor further includes at least one of direction information, tilt information, altitude information, or location information of the electronic device.

17. The method of claim 11, further comprising:
displaying the at least one GUI included in the first user interface in the first area; and
identifying a specified external object included in an image obtained by using a camera; and
when it is determined that the number of specified external objects exceeds a specified value, terminating a display of the first user interface.

18. The method of claim 17, wherein the identifying of the specified external object included in the image obtained by using the camera includes:
analyzing a correlation between the specified external object and the electronic device by using information associated with the specified external object and the motion information obtained by using the at least one sensor; and
when it is determined that the correlation satisfies a specified condition, terminating the display of the first user interface.

19. The method of claim 11, further comprising:
displaying the first user interface in the first area or the second area; and
when it is determined that the movement speed exceeds a second speed, terminating a display of the first user interface.

20. The method of claim 11, further comprising:
receiving user information from an external electronic device through a wireless communication circuit; and
determining whether to display the first user interface, based on the user information.

* * * * *